United States Patent [19]

Hefren

[11] 4,225,123
[45] Sep. 30, 1980

[54] SNUBBER ASSEMBLY FOR MOTOR HOMES

[76] Inventor: Fred W. Hefren, P.O. Box 551, Arkansas City, Kans. 67005

[21] Appl. No.: 3,890

[22] Filed: Jan. 16, 1979

[51] Int. Cl.² ............................................. F16F 3/02
[52] U.S. Cl. ...................................... 267/28; 267/60; 267/71; 267/151; 267/169; 267/177; 280/715; 280/726
[58] Field of Search ................. 267/4, 12, 28, 30, 33, 267/22 R, 60, 61 R, 70, 71, 48, 51, 615, 151, 152, 162, 169, 177; 280/689, 715, 726

[56] References Cited

U.S. PATENT DOCUMENTS

| | | | |
|---|---|---|---|
| 1,078,057 | 11/1913 | Mitchell | 267/28 |
| 1,156,376 | 10/1915 | Smith | 267/22 R |
| 1,390,326 | 9/1921 | Barry | 267/60 |
| 1,471,474 | 10/1923 | Dahlstrom | 267/28 |
| 2,123,388 | 7/1938 | Viguerie, Jr. | 267/60 X |
| 2,193,881 | 3/1940 | Peglow | 267/60 X |
| 2,595,642 | 5/1952 | Daland | 267/70 X |
| 2,658,749 | 11/1953 | Alletto | 267/28 |
| 3,292,917 | 12/1966 | Sherburne | 267/162 |
| 3,650,498 | 3/1972 | Deak | 267/177 X |
| 3,721,457 | 3/1973 | Tracy et al. | 280/689 X |

FOREIGN PATENT DOCUMENTS

Ad.34069  11/1928  France ........................................ 267/28

*Primary Examiner*—George E. A. Halvosa
*Attorney, Agent, or Firm*—Marcus L. Bates

[57] ABSTRACT

A snubber assembly for vehicles comprised of a housing attached to each of the main frame members of the vehicle chassis. A compression spring and compression rod is located with in the housing, with the rod having a free end which extends into fixed relationship respective to the vehicle axle. Movement between the chassis and the axle loads and unloads the compression spring, thereby enhancing the ride and stability of the vehicle. The snubber preferably is attached to the rear axle, and for maximum safety and additional comfort, another snubber is located at each of the fore and aft spring positions.

2 Claims, 6 Drawing Figures

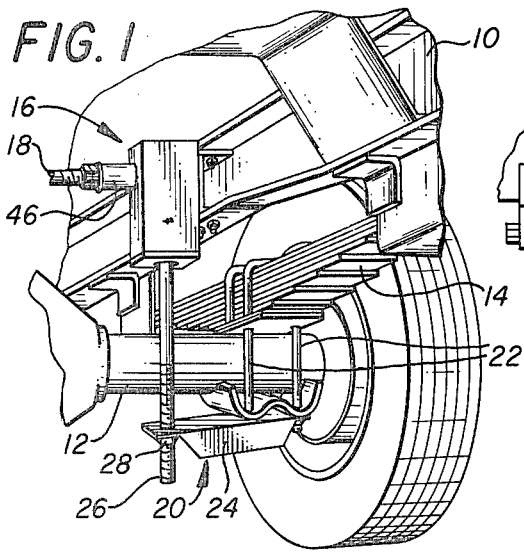
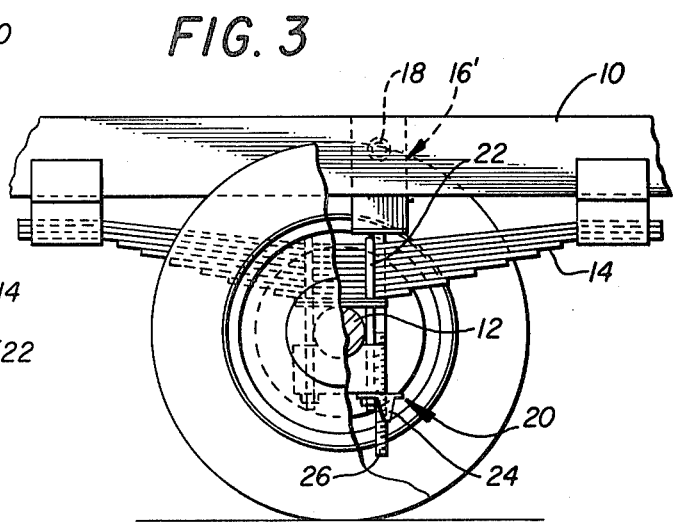
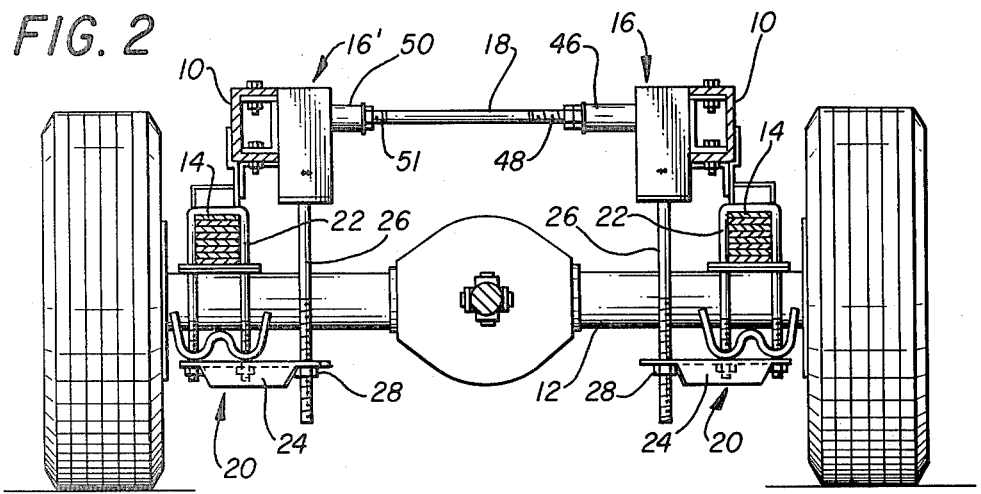
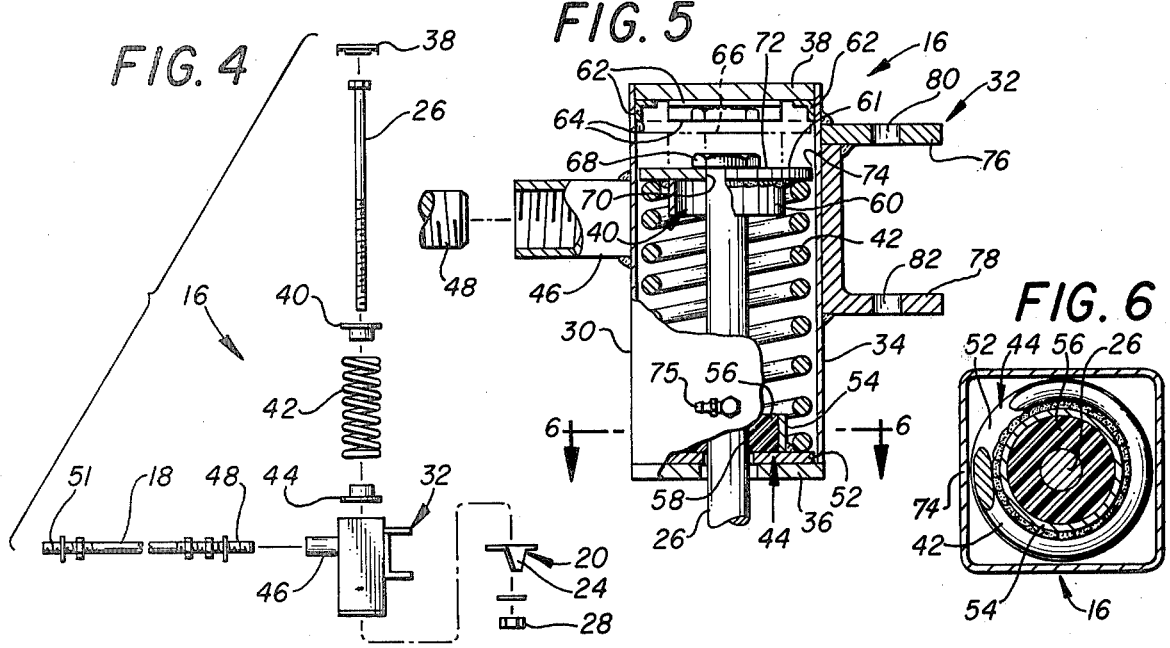

SNUBBER ASSEMBLY FOR MOTOR HOMES

BACKGROUND OF THE INVENTION

Recreational vehicles necessarily require a large external surface area in order to enclose a sufficient volume within which occupants can live in comfort. The structure is selected from lightweight material in order that the gross weight is minimized, thereby reducing the energy requirements of the prime mover.

In order to accommodate the large structure, it is necessary to select a large truck type chassis. The large chassis includes suspension springs designed for carrying loads substantially in excess of the weight presented by the motor home structure. The mismatch between the suspension system and the motor home structure causes the springs to ride near the unloaded or unflexed position.

When large tractor type trucks pass in close proximity to a motor home, the interacting air currents therebetween induce dangerous movements into the motor home because of the large surface area and lightweight construction thereof. This same condition is often encountered when driving through mountain passes and when driving under gusty or windy conditions.

Accordingly, it is desirable to be able to induce stability between the chassis and axle of a motor home by augmenting the action of the suspension system thereof. Such a desirable expedient is the subject of the present invention.

SUMMARY OF THE INVENTION

A snubber assembly for attachment between the axle and main frame member of a vehicle so that movement therebetween is resisted by a spring device which is contained within and forms part of the snubber device. The snubber assembly comprises a housing having a closure member at opposed ends thereof, and the before mentioned spring means is located therewithin. A connecting rod extends through an aperture formed in one closure means, through the spring means, where the rod terminates in fixed relationship respective to the spring end which is opposed to the apertured closure means. The end of the rod extending away from the housing is provided with attachment means by which it can be affixed to either of the axle and the main frame, while the housing has attachment means provided thereon by which it can be affixed to the other of the main frame and the axle.

In the preferred form of the invention, the housing is rigidly affixed to the main frame member of the chassis, while the free depending end of the connecting rod is affixed to the axle. Each of the housings is reinforced in spaced relationship respective to one another by a center rod.

Accordingly, a primary object of the present invention is the provision of a snubber device which imparts improved driving characteristics into a vehicle.

Another object of the present invention is the provision of a spring biasing means associated with each spring of the suspension system of a vehicle which changes the loaded position of the main spring assembly thereof.

A further object of this invention is the provision of a biasing means associated with the axle and chassis of a vehicle which causes the suspension springs thereof to be resistingly loaded.

A still further object of this invention is the provision of a resilient biasing means interposed between the main frame and the axle of a vehicle which improves the handling characteristics and prevents swaying of the vehicle.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a fragmentary, perspective view of a vehicle having apparatus made in accordance with the present invention mounted thereon;

FIG. 2 is a front, part cross-sectional view of a vehicle having apparatus disclosed therein made in accordance with the present invention;

FIG. 3 is a fragmentary, side elevational view of part of the apparatus disclosed in the foregoing figures;

FIG. 4 is an exploded view of part of the apparatus disclosed in the foregoing figures;

FIG. 5 is an enlarged, part cross-sectional view of the apparatus disclosed in FIG. 5; and, FIG. 6 is a cross-sectional view taken along line 6—6 of FIG. 5.

DETAILED DESCRIPTION OF THE PREFERRED EMBODIMENT

In FIG. 1, there is disclosed a vehicle having a chassis which includes a main frame 10 supported by a rear axle 12 by means of leaf spring 14. Snubber apparatus 16, made in accordance with the present invention, is attached to the main frame and to the axle. As seen in FIG. 4, in conjunction with other figures of the drawings, the apparatus includes the illustrated two box-like housings associated with rear axle and the opposed frame members, with the housings being tied together by a center rod 18.

As seen in FIG. 2, each snubber apparatus 16 and 16' is attached to the axle by means of plate member 20 positioned in underlying relationship respective to the axle, and in bolted relationship with respect to the U-bolts 22. The U-bolts are supplied by the manufacturer for affixing the leaf spring to the axle in the usual manner.

Plate member 20 includes a vertical web member 24 which reinforces the member and adds great strength thereto. As seen in the figures of the drawings, a spring compression rod 26 has one marginal end thereof reciprocatingly received within the box-like housing with the free terminal end thereof being bolted at 28 to the plate member. The housing preferably is square in cross-sectional configuration and includes opposed sides, 30 and 34, with the last side having a bracket member 32 affixed thereto by which the housing can be affixed to the chassis of the vehicle in the illustrated manner of the drawings.

As particularly seen illustrated in FIGS. 5 and 6, the housing has an apertured bottom 36, a top 38, and a top spring retainer 40. Spring 42 is captured between the top spring retainer 40 and a bottom spring retainer 44.

As best seen illustrated in FIGS. 2 and 5, tubular extension 46 has one end thereof rigidly attached to wall 30 of the housing, and includes a threaded hollow interior which threadedly engages long threads 48 of the center rod. Short threads 51 of the center rod threadedly engage a similar but shorter tubular extension 50, which likewise is rigidly attached to the opposed housing 16', and which likewise is internally threaded for threaded engagement with threaded surface 51 of the center rod. The threads 48 and 51 may be pitched in opposite directions so as to assume the characteristics of a turnbuckle in operation, if desired.

Looking now to FIGS. 5 and 6, which sets forth the details of the spring housing, the before mentioned bottom spring retainer 44 is seen to include a circular flange member 52 which bears against the inside face of bottom 36, with there being an upwardly extending skirt member 54 affixed to and depending therefrom to thereby form a spring chamber outwardly thereof. Nylon bushing 56 is affixed to the inside of the skirt. The bushing is apertured at 58 and slidably receives the compression rod in a reciprocating manner therethrough, and forms a seal at surface 58 for isolating the interior of the housing from the ambient.

The top spring retainer 40 includes a circumferentially extending skirt 60 loosely received within spring 42 with a circular flange member 61 thereof bearing against the upper end of the spring.

Upper housing cover 38 is provided with opposed angle members 62 positioned 90° respective to one another. The members 62 are received within the upper marginal end of the housing to provide an edge portion 64 which abuttingly receives the top spring retainer when the retainer assumes the position illustrated by the dot-dash line indicated by numeral 66.

The spring compression rod includes an enlargement 68 which is received within the areas bounded by members 62. The spring retainer is apertured at 70 for receiving the bolt therethrough while face 72 thereof abuttingly engages edges 64 of the spaced-apart stop members 62. The outer, circumferentially extending edge portion of the top spring retainer is guidably reciprocated within the housing with there being a small amount of tolerance at the four 90° positions, one of which is indicated at 74, between the housing and the outermost part of the spring retainer.

Grease fitting 75 enables the interior of the housing to be lubricated, thereby reducing wear and the noise level during operation. Bracket 32 includes spaced extensions, 76 and 78, either of which may be apertured at 80 and 82, for attachment to the main frame.

The apparatus is easily affixed to the chassis and rear axle of a recreational-type vehicle by bolting plate member 20 into the illustrated position shown in the drawings, with the bracket of the housing being attached to the main frame member by bolts. The adjustment nut 28 is made up and tightened to preload the springs 14 so that the springs do not ride at the unloaded position. This preloaded condition of the main springs 14 greatly enhances the riding comfort and stability of the vehicle.

When the vehicle is subjected to gust loads, such as encountered when passing large tractor trailors and the like, the dangerous, lateral motion induced into the vehicle is dampened, thereby greatly improving the stability and driving characteristics of the vehicle.

The center rod 18 prevents any substantial rocking motion from being induced between the housings and the two main frame members; thereby obviating the danger of metal fatigue occurring over a prolonged period of time, as well as further enhancing or stabilizing each of the opposed main frame members of the chassis respective to one another.

It is preferred to preload the spring 42 such that the top spring retainer is positioned approximately 20% of its travel respective to the bottom spring retainer. The bottom spring retainer cooperates with the top spring retainer to form a stop means. The spring 42, when skirts 54 and 60 are moved into abutting engagement with one another, is 90 to 95 percent compressed.

The upper stop members 64 abuttingly engages face 61 of the top spring retainer, thereby preventing the head 68 of the compression rod from distorting the box cover from repeated contact therewith.

I claim:

1. In a vehicle having spaced-apart spring means by which a chassis is suspended from an axle, the combination with said chassis and axle of a snubber assembly for each of said spaced apart spring means;

each said snubber assembly includes a housing, means for attaching said housing to said chassis at spaced apart locations such that said housing is vertically positioned at a location which is above the axle; an upper housing cover at the upper end of said housing, a top spring retainer means, a spring compression rod having opposed ends with one end thereof being affixed to said top spring retainer means; a lower housing cover having a central aperture, a lower spring retainer supported on said lower housing cover; a spring contained within said housing and having one end bearing against said top spring retainer means and the other end bearing against the lower spring retainer;

said spring compression rod has a marginal length thereof which reciprocatingly extends through said aperture in said lower housing cover;

and further including a center rod means directly interconnecting two of said housings only to one another for maintaining the housings in spaced relationship respective to one another;

said lower spring retainer includes an upwardly directed skirt member affixed thereto telescopingly received within a lower marginal end of the spring;

a bushing means concentrically arranged respective to said aperture and located between said skirt member and said compression rod which slidably receives the compression rod in a reciprocating manner therethrough;

means attaching the free end of said rod to said axle, and means by which the spring compression rod can be adjusted to pre-load the compression spring within the housing, thereby preloading the main springs of the vehicle and enhancing driving stability and comfort.

2. A snubber assembly means in combination with the main frame and axle of a vehicle;

said snubber assembly means comprising a snubber assembly including a spring housing, upper and lower spaced apart closure members for closing the ends of said spring housing, a compression spring, a top spring retainer, a lower spring retainer; means forming an aperture through said bottom closure member;

a spring compression rod attached to said top spring retainer and extending therefrom for engagement with the axle;

said upper and lower spring retainers being axially aligned with respect to said housing and spring; a marginal length of said spring compression rod extends through said bottom spring retainer, compression spring, and through the aperture in the lower closure member;

said snubber assembly means including two said snubber assemblies, means by which each of said snubber assemblies' spring housing can be attached to said main frame at laterally spaced locations such that said spring housings are vertically aligned, with the compression rod thereof extending downwardly towards the axle;

and further including a center rod directly interconnecting said spring housings only to one another for maintaining the housings in spaced relationship respective to one another;

each said lower spring retainer including an upwardly directed skirt member affixed thereto telescopingly received within a lower marginal end of a respective spring;

a bushing means axially aligned with each said aperture and located between each said skirt member and each said compression rod which slidably receives a marginal length of each compression rod;

and means by which each said compression rod can be adjustably affixed to the axle so as to enable each spring to be preloaded after the snubber assembly has been attached to the vehicle.

* * * * *